No. 12,135. REISSUED JULY 28, 1903.
S. JACOBS.
ELEVATED HAY CARRIER.
APPLICATION FILED APR. 25, 1903.
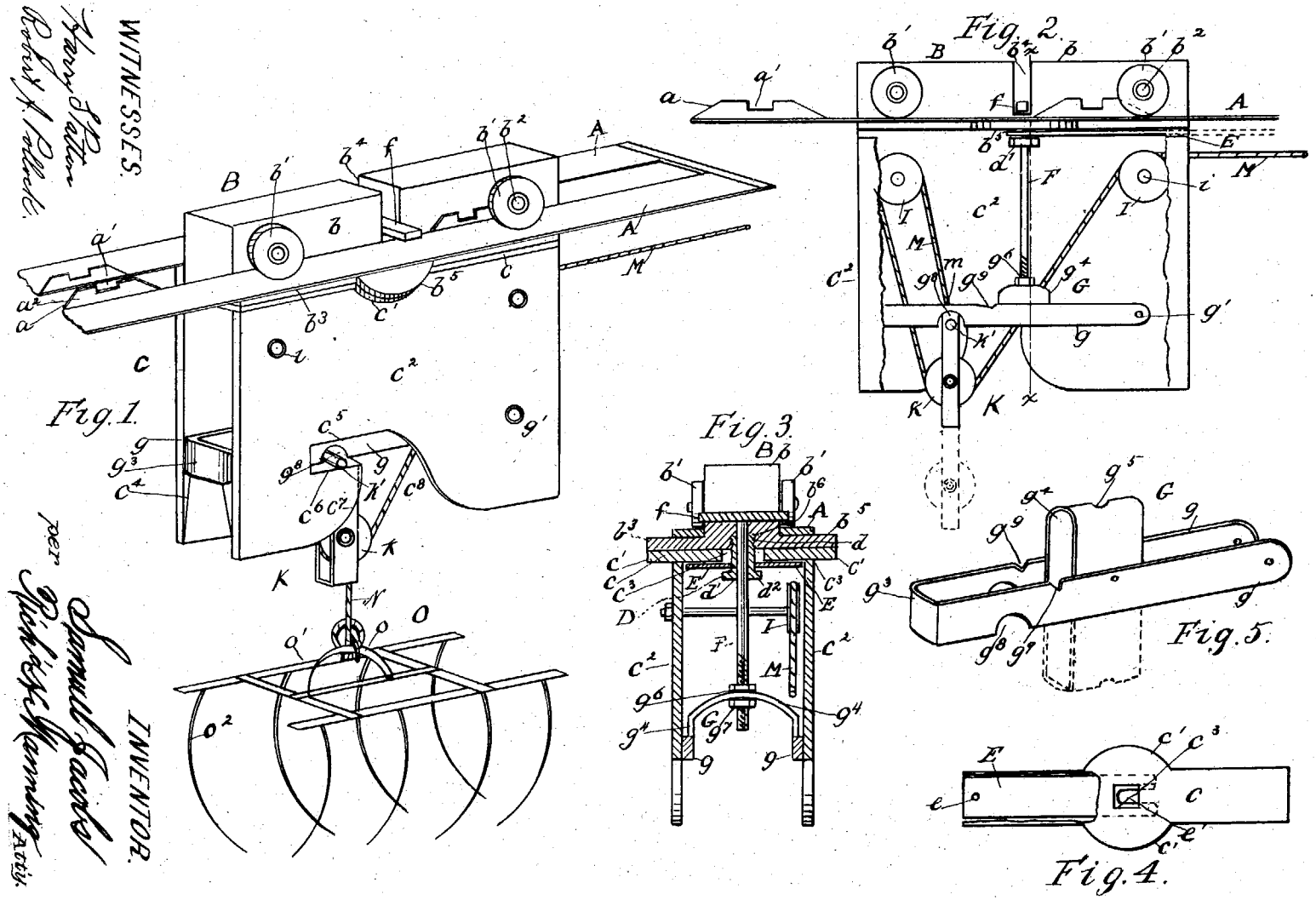
WITNESSES.
Harry S. Patton
Robert A. Pollock.
INVENTOR.
per Samuel Jacobs
Richard H. Manning Atty.
THE NORRIS PETERS CO., PHOTO-LITHO., WASHINGTON, D. C.

No. 12,135. Reissued July 28, 1903.

UNITED STATES PATENT OFFICE.

SAMUEL JACOBS, OF LAWRENCE, KANSAS.

ELEVATED HAY-CARRIER.

SPECIFICATION forming part of Reissued Letters Patent No. 12,135, dated July 28, 1903.

Original No. 714,306, dated November 25, 1902. Application for reissue filed April 25, 1903. Serial No. 154,369.

*To all whom it may concern:*

Be it known that I, SAMUEL JACOBS, a citizen of the United States of America, residing at Lawrence, in the county of Douglas and State of Kansas, have invented certain new and useful Improvements in Elevated Hay-Carriers; and I do hereby declare that the following is a full, clear, and exact description of the invention, such as will enable others to make and use the same, reference being had to the accompanying drawings, forming a part of this specification.

The objects of my invention are, first, in an elevated hay-carrier, to control automatically the locking in position and the unlocking of a fall-rope carrier; second, to retain the movement of an elevated sheave-frame upon the track-rails during the rotation of the frame; third, to enable the sheave-frame to be readily disconnected from the carriage; fourth, the reversal in position of the locking-lever for long-distance delivery.

The invention consists in the novel construction and combination of parts, such as will be first fully described, and specifically pointed out in the claims.

In the drawings, Figure 1 is a view in perspective of the novel hay-carrier, showing the elevated track-rails and the fall-rope carrier for the hay-fork in a locked position, the carrier being shown at the near end of the track. Fig. 2 is a side view of the invention with one of the sides of the sheave-frame broken away to show the operative parts. Fig. 3 is a vertical sectional view of the invention, taken on the line $x\,x$ of Fig. 2. Fig. 4 is a plan view of the sheave-frame, showing the parts of the top of the frame broken away to show the slide on the inner surface of the top of the sheave-frame for engaging with the hollow king-bolt. Fig. 5 is a detail view of the locking-lever for receiving the pulley-block in the sheave-frame.

Similar letters of reference indicate corresponding parts in all the figures of the drawings.

Referring to the drawings, A A represent parallel track-rails for supporting the sheave-frame, which are flat and of the proper width for the traction-wheels and arranged horizontally in position. These track-rails are arranged a short distance apart and extend the requisite distance in length for the conveyance of hay or other material. Upon the inner edge of each of the track-rails is secured a longitudinal upright keeper-plate $a$, in which is a notch $a'$ of the proper length. The forward and rear ends of the plate $a$ are inclined in opposite directions from the upper edge of the plate to the surface of the track-rails. These keeper-plates $a$ are arranged on the track-rails in series opposite each other and at the requisite distance apart.

B represents the carriage supporting the sheave-frame and which consists of a longitudinal body or block $b$, arranged within the space between the track-rails A A and extending in height a short distance above a line horizontal with the track-rails. Upon each side of the block $b$ and near the forward and rear ends are wheels $b'\,b'\,b'\,b'$, which are mounted on journals $b^2$, connected with the sides of the block, and move over the upper surface of the track-rails without contacting with the plate $a$. From the sides of the block or body $b$ and at the lower edge of said block extend the guide-flanges $b^3\,b^3$, which extend upon the lower surfaces of the track-rails and nearly to the line of the outer edges of said rails. Upon the longitudinal edges of the flanges $b^3\,b^3$, at a point equidistant from the ends of the said flanges, are outwardly-curved extensions $b^5 b^5$, drawn upon the arc of a circle and which afford a broad bearing for the sheave-frame, especially in rotation. In the block $b$, equidistant from the ends of said block, is a transverse slot $b^4$, which extends downwardly nearly to the line of the surface of the track-rails.

C represents the rotatable sheave-frame, consisting of the top plate $c$, which is of the same length as the block $b$ and which extends in width nearly to the line of the outer edges of the track-rails A A. With the outer edges of the top $c$ are connected rigidly the sides $c^2\,c^2$ of the sheave-frame, which extend downwardly the proper distance to support the operative devices. A portion $c'$ of the outer edges of the top plate $c$ of the sheave-frame extends outwardly a short distance beneath the curved extensions $b^5\,b^5$ of the flanges $b^3\,b^3$, the outer edges of which describe an arc of a circle of the same degree as the extensions $b^5\,b^5$. For the purpose of removably connecting the carriage B and the sheave-frame together in the top $c$ of the sheave-frame at a point equidistant from the ends of said top is a rectangular-shaped opening $c^3$.

In the under side of the block $b$, directly above the opening $c^3$, is a screw-opening $b^6$, in which is inserted the screw-threaded end $d$ of a hollow king-bolt D. The lower end of the king-bolt extends through the opening $c^3$ and a short distance below the inner surface of the top $c$ of the sheave-frame C, and upon said lower end of the bolt is a square head $d'$. Through the bolt D extends a longitudinal opening $d^2$.

Within one end of the sheave-frame is inserted a flat locking-plate E, which bears against the inner surface of the top $c$ of the sheave-frame, the inner end being cut away at $e'$ in the arc of a circle to extend part way around the king-bolt D and between the upper surface of the head $d^2$ of the bolt and the top $c$ of the sheave-frame, the space being sufficient to admit the thickness of the plate E. The outer end of the plate is secured by a nail or screw passing through the perforation $e$ and into the under surface of the top $c$.

In the transverse slot $b^4$ in the block $b$ is a latch-bar $f$, which moves freely therein, the ends of which bar extend beyond the outer surface of the side of block $b$ to a point in line with the outer surface of the keeper-plates $a$ $a$ on the track-rails A A. With the latch-bar $f$ is connected the upper end of an adjustable rod F, the lower end of which rod is screw-threaded and extends downwardly the proper distance to connect with the reversible locking-lever G. Said lever consists of the side plates $g$ $g$, which are connected pivotally at $g'$ with the respective inner surfaces of the sides $c^2$ $c^2$ of the sheave-frame near the rear end of said frame and at a point about one-third the distance upwardly toward the top $c$ of the sheave-frame from the lower edges thereof. The forward ends of the lever extend nearly to the forward edges of the sides $c^2$ $c^2$ of the frame C and are connected together by a transverse portion or plate $g^3$. In order to afford a normal horizontal support for the forward ends of the lever G, the inner surfaces of the sides $c^2$ $c^2$ of the sheave-frame are inclined inwardly toward each other from the lower edges of the sides $c^2$ $c^2$ and extended upwardly, so as to form the shoulders $c^4$ $c^4$ equal in width to the thickness of the plates upon which the plates $g$ $g$ rest. With the lower end of the rod F is connected a U-shaped strap $g^4$, the ends of which are pivotally connected with the inner sides of the plates $g$ $g$ of the locking-lever G. In the strap $g^4$ is a perforation $g^5$, through which the rod F extends, and upon said rod is a nut $g^6$, which bears upon the outer surface of the strap $g^4$, and a nut $g^7$, which bears upon the under surface of said strap. In the lower edge of each plate $g$ and a short distance from the pivotal point of the strap $g^4$ in the direction of the forward transverse plate $g^3$ is a semicircular notch $g^8$. Upon the upper edge of the plates $g$ $g$ is a V-shaped depression $g^9$, the angle of one side of the depression being more obtuse in the direction of the forward end of the said plate $g$. In the sides $c^2$ $c^2$ of the sheave-frame opposite the plates $g$ $g$ of the locking-lever and the notches $g^8$ $g^8$ are longitudinal openings $c^5$ $c^5$, which extend a short distance forward of the position of the notch $g^8$ and a distance greater in proportion rearwardly. The lower edge of the opening $c^5$ extends a slight distance rearwardly of the rear end of the notch $g^8$ to form a shoulder $g^6$, and from said shoulder the portion of the sides $c^2$ is cut away in an outwardly and downwardly curved line, as at $c^7$. From the rear upper edge of the slot $c^5$ the side $c^2$ of the frame is cut away in a rearwardly and outwardly curved line, as at $c^8$, between which curved lines and the curved line $c^7$ is an open space for the entrance of the pin supporting the pulley-block.

I I represent the sheaves in frame C, which are journaled at $i$ near the respective forward and rear ends of said frame a short distance beneath the under surface of the top $c$.

K is the fall-pulley block, in which is the pulley $k$. Upon the upper end of block K is a transverse pin $k'$, the ends of which rest, when the block is connected with the sheave-frame, upon the shoulders $c^6$.

M represents the cable, one end $m$ of which is connected with the upper end of the block K, the other end of which cable extends upwardly over the sheave I at the forward end of the sheave-frame, thence downwardly under the pulley $k$ in the pulley-block K, thence upwardly and over the sheave I at the rear end of the sheave-frame, thence connected with any suitable means of moving the sheave-frame. With the lower end of the block K is connected the upper end of the rope N, the lower end being connected with a plate $o'$ on the spring-plate $o$ of the hay-fork O of the usual and well-known construction, the teeth $o^2$ aiding to grasp the hay in the well-known manner.

In operation and for the purpose of moving quantities of material, such as hay, from one place to another and dumping the hay at various places beneath the track-rails A A the pulley-block K is removed from the sheave-frame C by raising the latch-bar $f$, the position of the keeper-block being preferably located on the track-rail above the position of the hay to be raised, the latch-bar $f$ being within the notches $a$ $a$, and the locking bar or lever G is raised in position, so that the block K may be removed from the openings or slots $c^5$ $c^5$ of the frame C by a swinging motion imparted to the fork-frame O, and under a slack in the cable M the hay-fork is permitted to descend as far as is necessary to grasp a quantity of the hay or other material. Power being applied to draw upon the cable M, the quantity of material is raised with comparatively little power, and as the pin $k'$ strikes the curved lines $c^7$ $c^8$ of the entrance to opening $c^5$ the purchase of the cable M from the forward sheave I will draw the upper end of the pulley-block toward the forward end of said opening and permits the pin to rest upon the lower edge $c^6$ of said opening. The carriage B and the sheave-frame are moved along the track-rails until the place desired to deposit the hay or other material is reached. The drawing power upon the cable M is then slackened, and by means of a short rope on the hay-fork frames the load is deposited in its proper place. Then the carriage B is drawn back, where the operation of loading the hay-fork is repeated. The sheave-frame C is rotatable in position whenever required. When it is desired to hold the pulley-block within the opening $c^5$, so that a sudden throw of the hay-fork discharged of its load will be released from the sheave-frame, the rod F is first disconnected from the U-shaped strap $g^4$ by the removal of the nut $g^7$. The plate E is then removed from the frame C and the nut $d'$ of the king-bolt D drawn through the opening $c^3$ in the top $c$ of the frame C, the rod F being drawn from the opening $d^2$ in the king-bolt, and the carriage-block B is separate from the sheave-frame C. The locking-lever G is then removed from the sheave-frame and reversed in position, and at the same time the strap $g^4$ is also reversed in position and the locking-lever pivotally connected with the frame C, as before. The carriage B and the frame C are then connected and the rod F extended through the king-bolt and connected with strap $g^4$, this action causing the notch $g^9$ to engage with the pin $k'$, the inclined surfaces of the notch affording an easy removal of the pulley-block.

The invention is applicable to the transportation of all kinds of material, or for store-service is especially valuable, the movement of the carriage B being actuated by the means employed in the present well-known carrier systems, the cable M in this instance being employed to raise and lower the parallel holders. The latch-bar $f$ is adjusted in position by the nuts $g^6$ $g^7$, which enables a latch-plate to be less in length or in one continuous length with notches at short or long intervals apart.

Such modifications of the invention may be employed as are within the scope of the invention.

Having fully described my invention, what I now claim as new, and desire to secure by Letters Patent, is—

1. A carriage-body, a king-bolt having a head rigidly connected with said body, and a frame having an opening in its top adapted to receive the head of the king-bolt, and a sliding plate extending between the inner side of the top of said frame and the head of the king-bolt.

2. In elevated carriers, the combination with suitable track-rails, of a carriage-body movable thereon, a rotatable sheave-frame and a hollow king-bolt connecting said frame with said carriage-body, a rod extending through the king-bolt, carrying devices detachably connected with the said frame, and locking devices therefor connected with said rod, a latch-bar on said rod, and keepers on the track-rails in the path of said latch-bar.

3. In elevated carriers, the combination with suitable track-rails, of a carriage-body movable thereon, a hollow king-bolt having a head rigidly connected with the body of said carriage, a rotatable sheave-frame detachably connected with the head of the king-bolt, having notches in the sides thereof, hoisting devices having pins adapted to enter the notches in the sides of the frame, securing devices within the frame for said pins, and releasing devices extending through the hollow king-bolt.

4. In elevated carriers, the combination with suitable track-rails, of a carriage-body, movable thereon, a sheave, a sheave-frame and a hollow king-bolt connecting said frame with the said carriage-body, said sheave having notches in the sides thereof, a tackle-block and falls within said sheave-frame, and pins upon said block adapted to enter the notches in the sheave-frame, a pivoted locking-bar within the sheave-frame, and a rod pivotally connected with said bar and extending through the hollow king-bolt, a latch-bar connected with the upper end of the said rod, and stationary keepers on the track-rails in the path of the latch-bar.

5. In elevated carriers, the combination with a movable frame having notches in the sides thereof, of a removable pivoted locking-bar and a reversible pivoted strap upon said lever.

6. In elevated carriers, the combination with suitable track-rails, of a carriage-body having a transverse slot arranged between said rails, and wheels upon said body mounted upon said rails, a rotatable sheave-frame having notches in the sides and openings leading thereto, and sheaves in the upper part of said frame, a hollow king-bolt connecting the carriage-body with the top of said sheave-frame, a locking-bar pivoted to said frame at one end and having notches registering with the notches in the sides of said sheave-frame, a strap pivotally connected with said bar, a rod adjustably connected with said strap and having its upper end extending through the hollow king-bolt, and a transverse latch-bar on said end, keepers on the track-rails in the path of said latch, a pulley-block and a rope extending over the sheaves in the sheave-frame and also through the pulley-block, and pins on the pulley-block adapted to enter the notches in the sides of the sheave-frame.

SAMUEL JACOBS.

Witnesses:
WILLIAM A. JACOBS,
R. J. HOLMDEN.